United States Patent
Kim (10) Patent No.: US 9,579,954 B2
(45) Date of Patent: Feb. 28, 2017

(54) DAMPER UNIT AND AIR VENT FOR VEHICLE USING THE SAME

(71) Applicant: HYUNDAI MOBIS CO., LTD., Seoul (KR)

(72) Inventor: Ki Yeong Kim, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 374 days.

(21) Appl. No.: 14/249,218

(22) Filed: Apr. 9, 2014

(65) Prior Publication Data

US 2015/0031278 A1    Jan. 29, 2015

(30) Foreign Application Priority Data

Jul. 24, 2013  (KR) .................. 10-2013-0087574

(51) Int. Cl.
*B60H 1/34* (2006.01)

(52) U.S. Cl.
CPC ... *B60H 1/3421* (2013.01); *B60H 2001/3478* (2013.01)

(58) Field of Classification Search
CPC ... B60H 1/3412; B60H 1/3414; B60H 1/3421
USPC .................................. 454/155, 152
See application file for complete search history.

(56) References Cited

U.S. PATENT DOCUMENTS

| | | | | |
|---|---|---|---|---|
| 5,069,112 A | * | 12/1991 | Takayama | B60H 1/3428 454/155 |
| 5,584,098 A | * | 12/1996 | Koyama | B60H 1/0065 16/441 |
| 5,741,179 A | * | 4/1998 | Sun | B60H 1/3414 454/155 |
| 6,059,652 A | * | 5/2000 | Terry | B60H 1/3435 454/154 |
| 6,254,175 B1 | | 7/2001 | Kim | |
| 6,582,293 B1 | * | 6/2003 | Siniarski | B60H 1/3414 454/155 |

(Continued)

FOREIGN PATENT DOCUMENTS

| | | | |
|---|---|---|---|
| CN | 2632389 Y | 8/2004 | |
| CN | 201672640 | * 12/2010 | ............. F24F 13/10 |

(Continued)

OTHER PUBLICATIONS

Chinese Office Action dated Dec. 30, 2015 of corresponding Chinese Patent Application No. 201410160120.8—7 pages.

*Primary Examiner* — Steven B McAllister
*Assistant Examiner* — Jonathan Cotov
(74) *Attorney, Agent, or Firm* — Knobbe Martens Olson & Bear LLP (57) ABSTRACT

The present invention provides an air vent for a vehicle, including: a housing which has an air outlet to which a duct is connected; and a damper unit which is inserted into and installed in the housing so as to open and close the air outlet, in which the damper unit includes: a damper knob which has a through hole into which a duct boss, which protrudes on the duct, is inserted, and one side surface connected to a damper, and drives the damper while being rotated; and a knob rubber which is made of rubber, covers a partial region of the damper knob, and extends to an inner surface of the through hole so as to be inserted into the through hole.

10 Claims, 7 Drawing Sheets

(56) References Cited

U.S. PATENT DOCUMENTS

| | | | | |
|---|---|---|---|---|
| 6,881,139 B2* | 4/2005 | Yang | ............... | B60H 1/3421 |
| | | | | 454/155 |
| 7,229,348 B2* | 6/2007 | Shibata | ............ | B60H 1/3421 |
| | | | | 454/155 |
| 7,354,340 B2* | 4/2008 | Mochizuki | ......... | B60H 1/3421 |
| | | | | 454/152 |
| 7,404,760 B2* | 7/2008 | Bowler | .......... | B60H 1/00671 |
| | | | | 454/143 |
| 7,575,510 B2* | 8/2009 | Kim | ............... | B60H 1/3428 |
| | | | | 454/155 |
| 9,073,407 B2* | 7/2015 | Kober | ............. | B60H 1/3414 |
| 9,110,492 B2* | 8/2015 | Puskar, Jr. | ............ | G05G 1/10 |
| 2003/0157880 A1* | 8/2003 | Nishida | ............ | B60H 1/3414 |
| | | | | 454/155 |
| 2010/0120347 A1* | 5/2010 | Gehring | ............. | B60H 1/345 |
| | | | | 454/155 |
| 2010/0263401 A1* | 10/2010 | Sakakibara | ........ | B60H 1/3421 |
| | | | | 62/408 |
| 2011/0319005 A1* | 12/2011 | Sawada | .......... | B60H 1/00678 |
| | | | | 454/155 |
| 2012/0009861 A1* | 1/2012 | Mercey | ............ | B60H 1/3421 |
| | | | | 454/162 |
| 2013/0005233 A1* | 1/2013 | Park | ............... | B60H 1/3421 |
| | | | | 454/155 |
| 2013/0267158 A1* | 10/2013 | Noichl | ............ | B60H 1/3414 |
| | | | | 454/155 |

FOREIGN PATENT DOCUMENTS

| | | |
|---|---|---|
| CN | 201672640 U | 12/2010 |
| JP | 2005-009751 A | 1/2005 |
| JP | 2011-163472 A | 8/2011 |
| JP | 2013-002616 A | 1/2013 |

* cited by examiner

DAMPER UNIT AND AIR VENT FOR VEHICLE USING THE SAME

CROSS-REFERENCE TO RELATED APPLICATIONS

This application claims priority to and the benefit of Korean Patent Application No. 10-2013-0087574 filed in the Korean Intellectual Property Office on Jul. 24, 2013, the entire contents of which are incorporated herein by reference.

TECHNICAL FIELD

The present invention relates to a damper unit and an air vent for a vehicle using the same, and more particularly, to a damper unit and an air vent for a vehicle using the same which may improve operational feeling of a damper knob without using an O-ring component.

BACKGROUND ART

In general, an air conditioning system is provided in a vehicle so as to adjust a temperature of the interior of the vehicle. An air vent is provided to discharge cool air or warm air, which is produced by the air conditioning system, into the interior of the vehicle. That is, the air vent changes a direction of air being discharged into the interior of the vehicle, or closes a passage so as to prevent air from being discharged.

Figure 1:
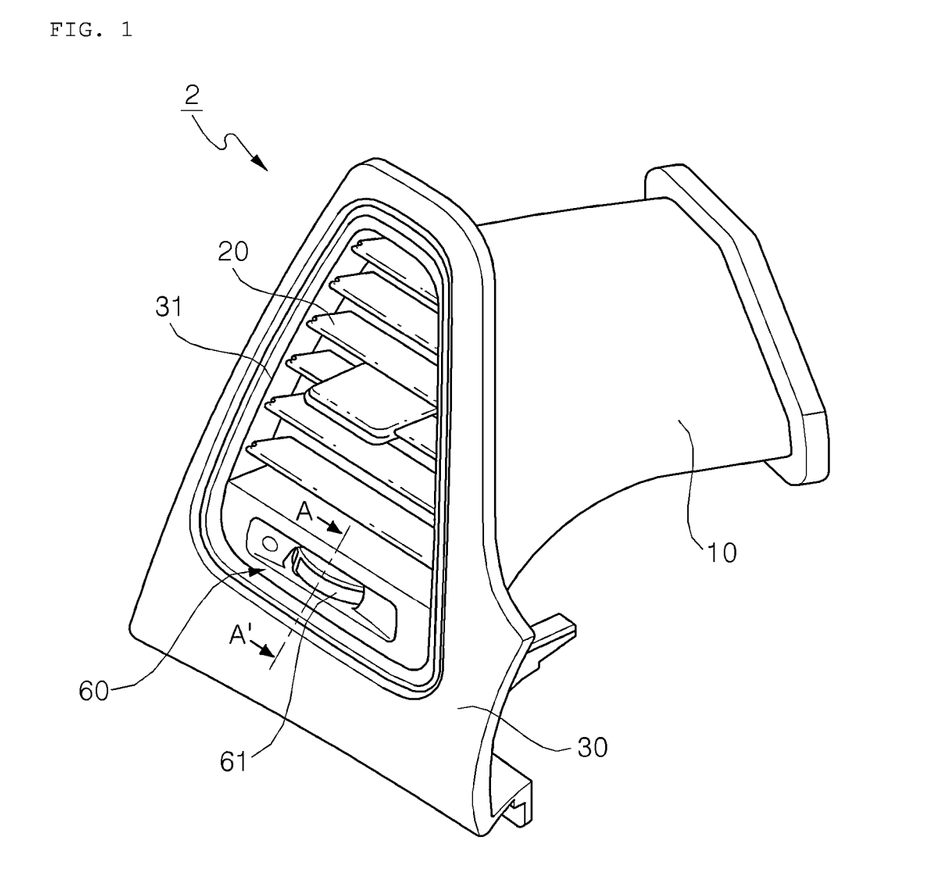
FIG. 1 is a perspective view of an air vent for a vehicle in the related art.
Figure 2:
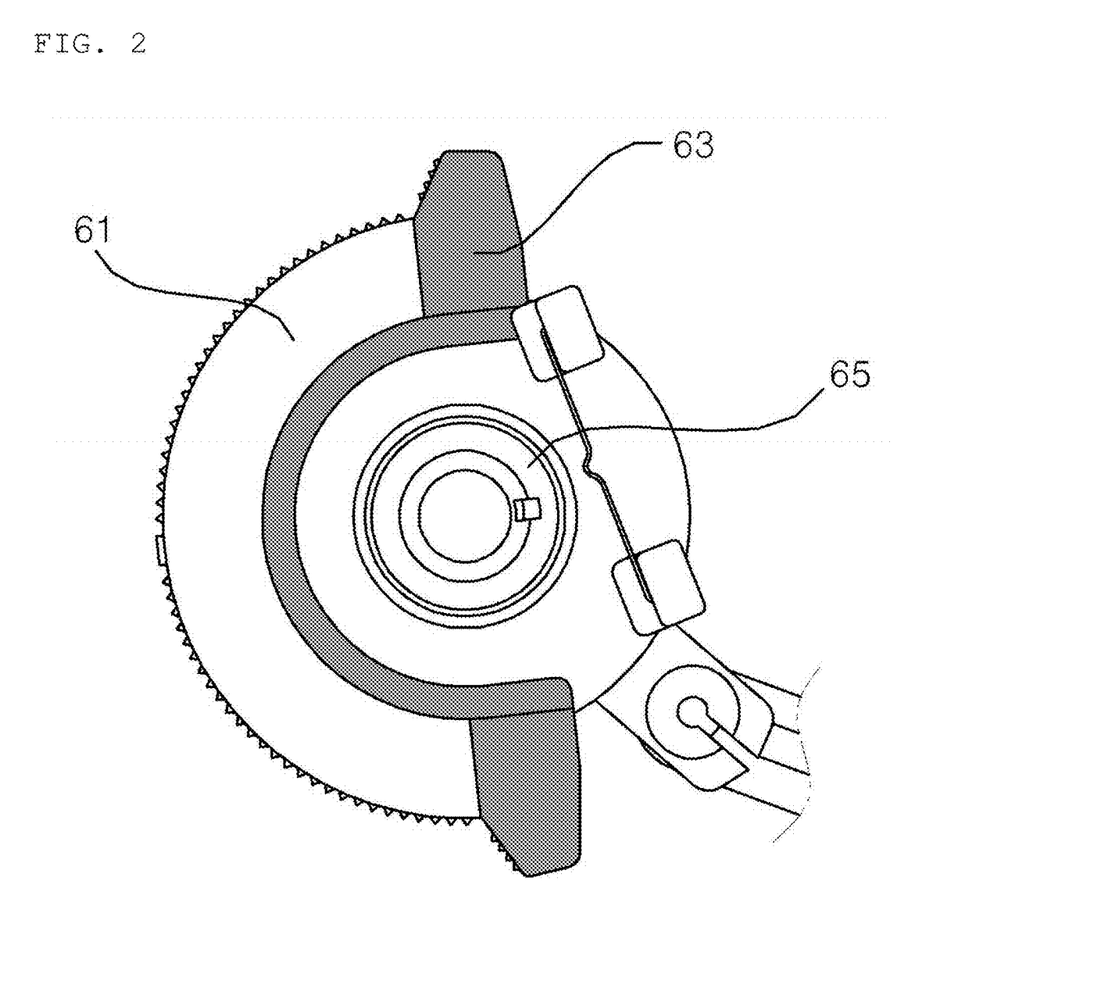
FIG. 2 is a bottom view illustrating a damper knob of FIG. 1.
Figure 3:
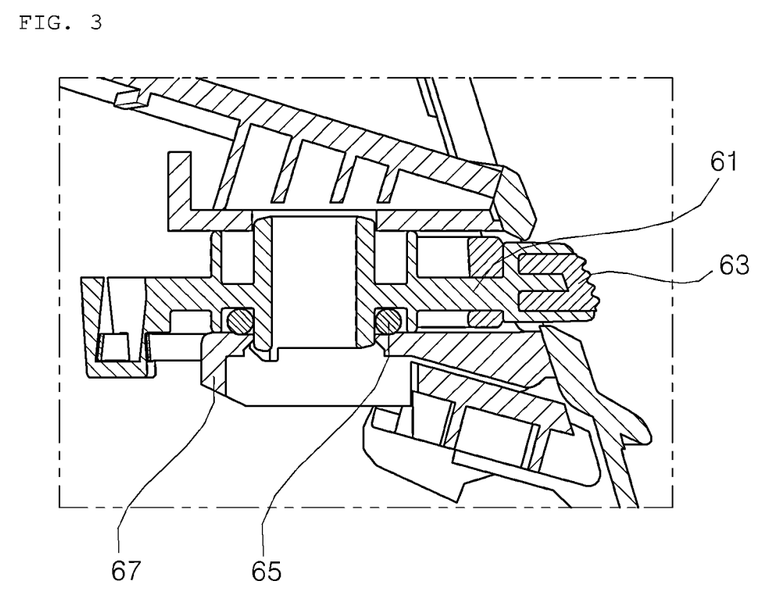
FIG. 3 is a cross-sectional view taken along line A-A' of FIG. 1.

FIG. 1 is a perspective view illustrating an air vent for a vehicle in the related art, FIG. 2 is a bottom view illustrating a damper knob of FIG. 1, and FIG. 3 is a cross-sectional view taken along line A-A' of FIG. 1.

Referring to FIGS. 1 to 3, an air vent 2 for a vehicle in the related art includes a housing 30 which has an air outlet 31, a duct 10 which is connected to the housing 30, and a damper unit 60 which opens and closes the air outlet 31.

The damper unit 60 blocks air from being discharged through the air outlet 31, or allows air to flow through the air outlet 31. The damper unit 60 includes a damper knob 61, a knob rubber 63, an O-ring 65, and a damper housing 67.

Referring to FIG. 2, the damper knob 61 is provided in a manner that a partial region of a basic body having a circular shape is covered by the knob rubber 63 in order to grip easily for operating thereof.

Referring to FIGS. 2 and 3, the O-ring 65 is coupled to a center portion of the damper knob 61, and the O-ring 65 is compressed against and coupled to the damper housing 67 when the damper knob 61 is coupled to the damper housing 67, thereby improving operational feeling for rotation of the damper knob 61.

However, in the air vent for a vehicle in the related art and the damper unit thereof, the O-ring needs to be separately provided on the damper knob, and thus there are problems in that it is difficult to assemble the air vent, and an effect of improving operational feeling is insignificant.

SUMMARY OF THE INVENTION

The present invention has been made in an effort to provide a damper unit and an air vent for a vehicle using the same which may further improve operational feeling of a damper knob, and allow the manufacture and assembly to be easily performed, without using an O-ring component.

An exemplary embodiment of the present invention provides an air vent for a vehicle, including: a housing which has an air outlet to which a duct is connected; and a damper unit which is inserted into and installed in the housing so as to open and close the air outlet, in which the damper unit includes: a damper knob which has a through hole into which a duct boss, which protrudes on the duct, is inserted, and one side surface connected to a damper, and drives the damper while being rotated; and a knob rubber which is made of rubber, covers a partial region of the damper knob, and extends to an inner surface of the through hole so as to be inserted into the through hole.

The damper knob may be tightly fitted with the duct boss.

The damper knob and the knob rubber may be integrally formed by dual injection molding.

The damper knob may have a stopper that protrudes from an outer circumferential surface of the damper knob so as to stop a rotational operation of the damper knob when the damper knob is rotated.

The knob rubber may be formed to cover an outer surface of the stopper.

Another exemplary embodiment of the present invention provides a damper unit of an air vent for a vehicle which includes a duct through which air is discharged, the damper unit including: a damper knob which has a through hole into which a duct boss, which protrudes on the duct, is inserted, and one side surface connected to a damper, and drives the damper while being rotated; and a knob rubber which is made of rubber, covers a partial region of the damper knob, and extends to an inner surface of the through hole so as to be inserted into the through hole.

The damper knob may be tightly fitted with the duct boss.

The damper knob and the knob rubber may be integrally formed by dual injection molding.

The damper knob may have a stopper that protrudes from an outer circumferential surface of the damper knob so as to stop a rotational operation of the damper knob when the damper knob is rotated.

The knob rubber may be formed to cover an outer surface of the stopper.

According to the damper unit of the present invention and the air vent for a vehicle using the same, there are effects in that operational feeling of the damper knob may be further improved, and manufacture and assembly may be easily performed, without using an O-ring component.

The foregoing summary is illustrative only and is not intended to be in any way limiting. In addition to the illustrative aspects, embodiments, and features described above, further aspects, embodiments, and features will become apparent by reference to the drawings and the following detailed description.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, an exemplary embodiment of the present invention will be described in detail with reference to the accompanying drawings. First, in denoting reference numerals to constituent elements of respective drawings, it should be noted that the same elements will be designated by the same reference numerals although they are shown in different drawings. Hereinafter, an exemplary embodiment of the present invention will be described, but, of course, the technical spirit of the present invention is not restricted or limited thereto, but the exemplary embodiment of the present invention may be modified by a person with ordinary skill in the art to be variously performed.

Figure 4:
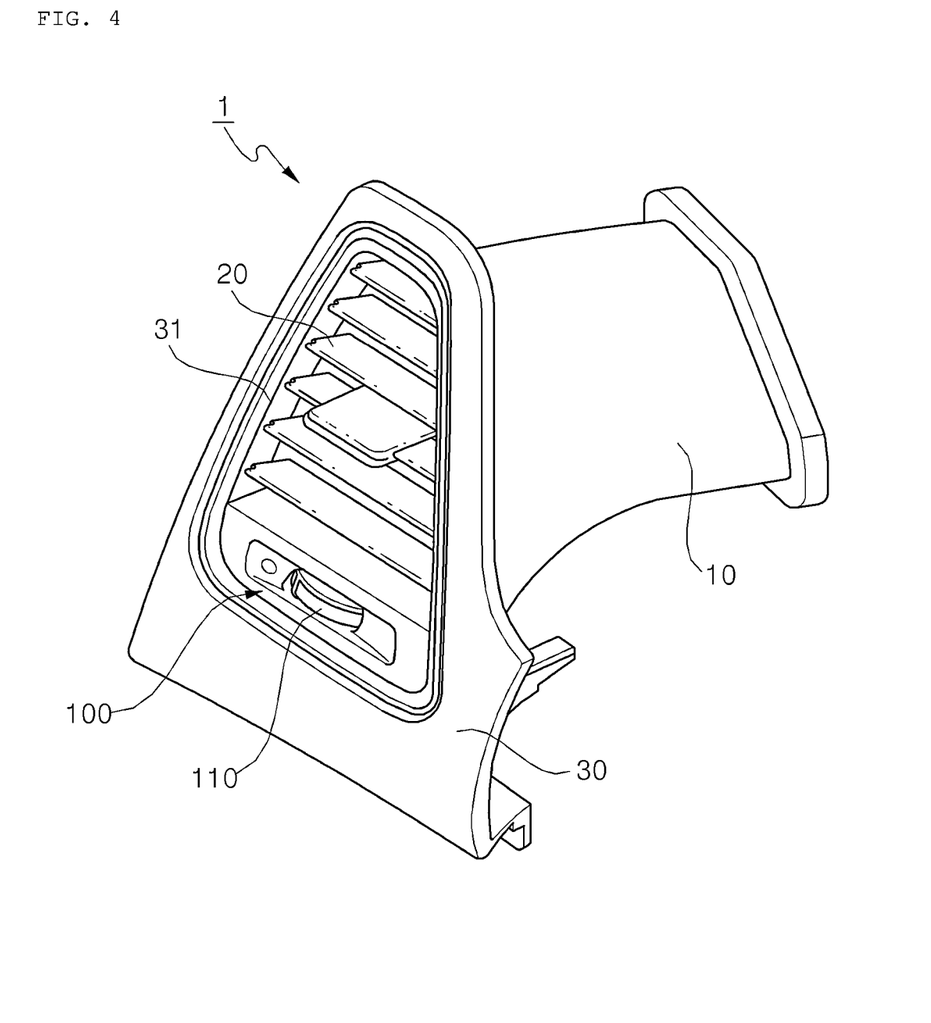
FIG. 4 is a perspective view of an air vent for a vehicle according to an exemplary embodiment of the present invention.
Figure 5:
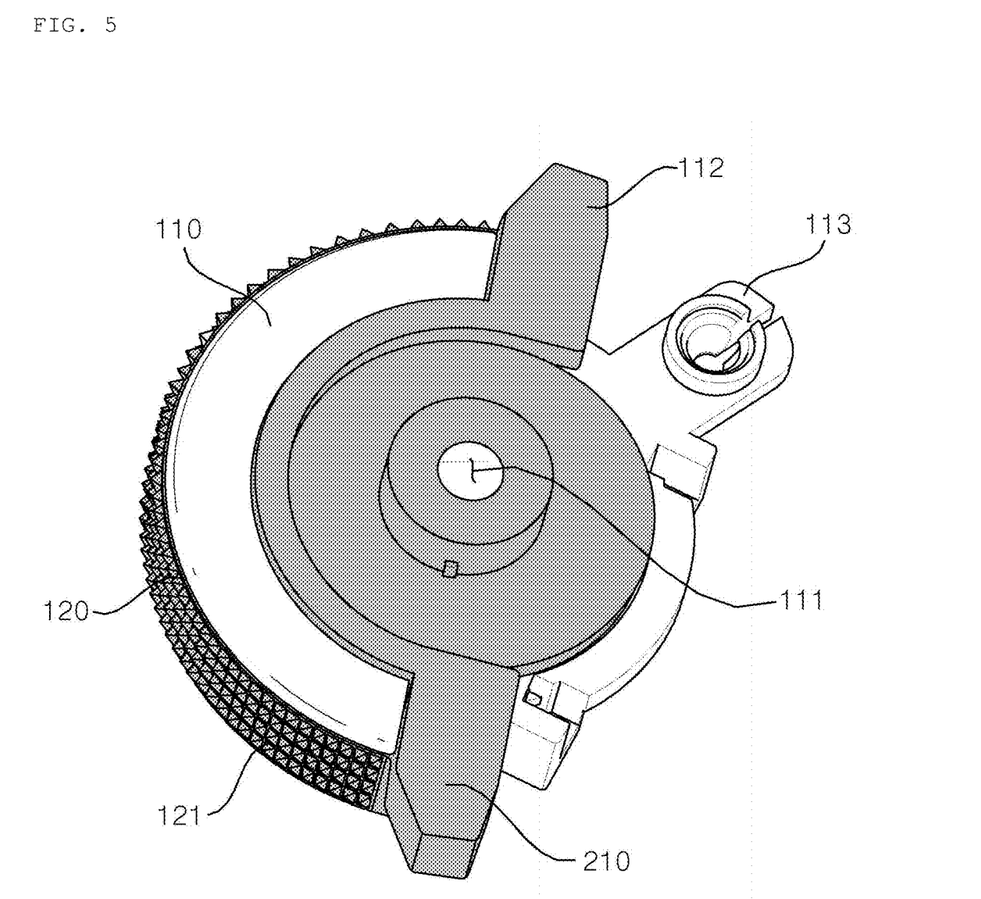
FIG. 5 is a perspective view illustrating a damper knob and a knob rubber of FIG. 4.
Figure 6:
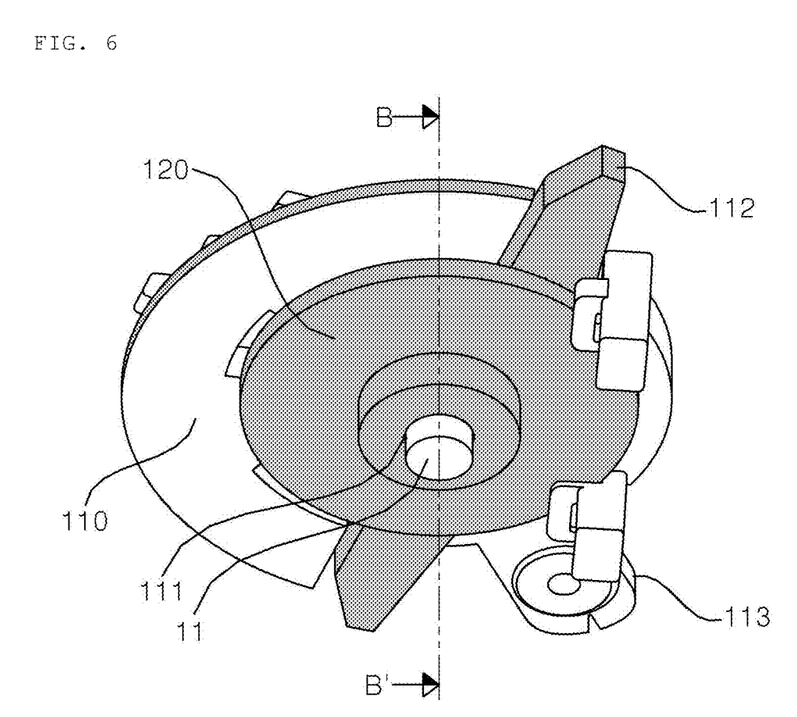
FIG. 6 is a perspective view illustrating a state in which the damper knob of FIG. 4 is coupled to a duct boss.
Figure 7:
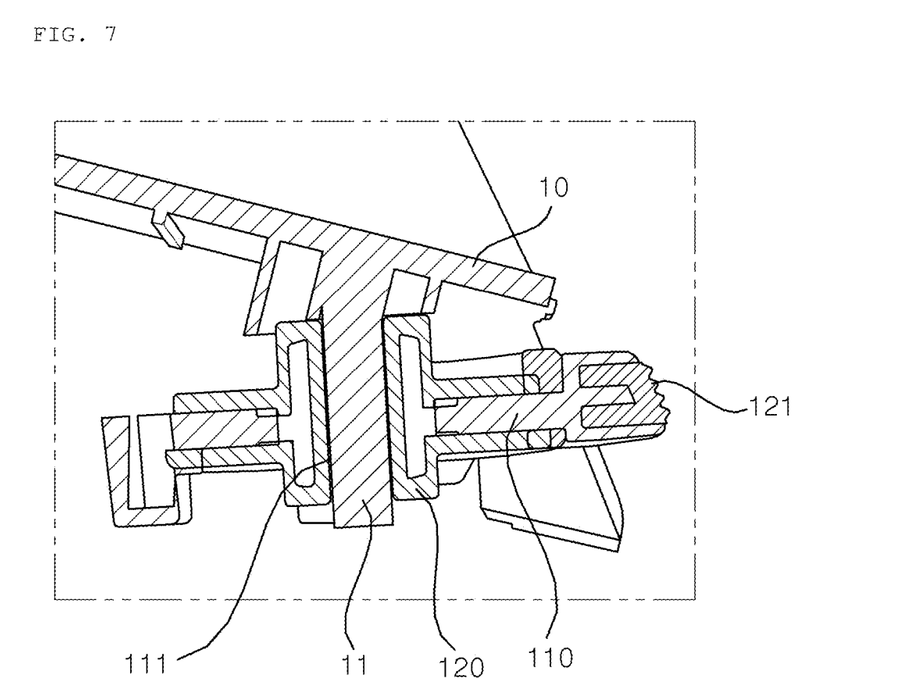
FIG. 7 is a cross-sectional view taken along line B-B' of FIG. 5.

FIG. 4 is a perspective view of an air vent for a vehicle according to an exemplary embodiment of the present invention, FIG. 5 is a perspective view illustrating a damper knob and a knob rubber of FIG. 4, FIG. 6 is a perspective view illustrating a state in which the damper knob of FIG. 4 is coupled to a duct boss, and FIG. 7 is a cross-sectional view taken along line B-B' of FIG. 5.

FIGS. 4 to 7 clearly illustrate only main characteristic parts for conceptual and clear understanding of the present invention. As a result, various modifications to the illustrations are expected, and the scope of the present invention does not have to be limited to specific shapes illustrated in the drawings.

Referring to these drawings, an air vent 1 for a vehicle according to an exemplary embodiment of the present invention includes a housing 30 which has an air outlet 31 to which a duct 10 is connected, and a damper unit 100 which is inserted into and installed in the housing 30 so as to open and close the air outlet 31.

Wind direction adjusting pieces 20, which adjust a blowing direction, are provided in the air outlet 31 of the housing 30. The duct 10 is connected to the air outlet 31 such that air flows to the air outlet 31 through the duct 10.

The damper unit 100 blocks air from being discharged through the air outlet 31, or allows air to flow through the air outlet 31.

Referring to FIG. 5, the damper unit 100 includes: a damper (not illustrated) which has a plate shape, is provided inside the air outlet 31, and blocks air or allows air to flow while being rotated; a damper knob 110 which has a through hole 111 into which a duct boss 11, which protrudes on the duct 10, is inserted, and one side surface connected to the damper (not illustrated), and drives the damper while being rotated; and a knob rubber 120 which is made of rubber, covers a partial region of the damper knob 110, and extends to an inner surface of the through hole 111 so as to be inserted into the through hole 111.

The damper knob 110 has a circular base, and a partial region of the damper knob 110 is exposed to the outside of the housing 30 such that the damper knob 110 is rotated when manipulated by a user. The through hole 111 is formed at a center portion of the damper knob 110 such that the duct boss 11, which protrudes from a lower portion of the duct 10, is inserted into the through hole 111. That is, as the user rotates the exposed region of the damper knob 110, the damper knob 110 is rotated about the duct boss 11 that is a rotation axis.

Stoppers 112 are formed at both sides of the exposed region of the damper knob 110, and the stoppers 112 are provided to protrude from an outer circumferential surface of the damper knob 110 so as to restrict the rotation of the damper knob 110. When the damper knob 110 is rotated by the user, the stopper 112 comes into contact with an inner side of the housing 30, thereby preventing the damper knob 110 from being rotated at a predetermined angle or more.

A rod connecting portion 113, which is connected to the damper by a connecting member, is provided on one side surface of the damper knob 110.

The knob rubber 120 is made of rubber, and covers a partial region of the damper knob 110. Specifically, the knob rubber 120 is provided to cover a portion of the damper knob 110 which is exposed to the outside of the housing 30, thereby improving tactile property when the user grasps the knob rubber 120 so as to rotate the damper knob 110. A plurality of contact projections 121 is provided on a surface of the knob rubber 120 so as to increase frictional force when the user touches the knob rubber 120.

The knob rubber 120 is provided to cover portions of the stoppers 112 of the damper knob 110. The knob rubber 120 is provided on the stoppers 112, and as a result, when the stoppers 112 come into contact with inner surfaces of the housing 30, operational feeling may be improved, contact noise may be prevented, and damage to components may be prevented by mitigating impact.

The knob rubber 120 of the present exemplary embodiment is provided to be inserted into the through hole 111 of the damper knob 110 and then cover the inner surface of the through hole 111. Since the knob rubber 120 is provided to be extended to the inner surface of the through hole 111, the damper knob 110 is tightly fitted with the duct boss 11. Since the damper knob 110 is tightly fitted with the duct boss 11, a contact area between the damper knob 110 and the duct boss 11 is increased when the damper knob 110 is rotated, thereby improving operational feeling.

The damper knob 110 and the knob rubber 120 are integrally formed by dual injection molding. Therefore, there are effects in that a manufacturing process is simple, and manufacturing costs are reduced because there is no need for a separate assembly process.

As such, according to the damper unit 100 of the present invention and the air vent 1 for a vehicle using the same, there is an effect in that operational feeling of the damper knob 110 may be further improved. The damper unit may be conveniently manufactured without using an O-ring and damper housing components in the related art, and as a result, assembly property is improved, and manufacturing costs are reduced. The damper knob 110 and the knob rubber 120 are integrally formed by dual injection molding, and as a result, there is an effect in that the damper knob 110 and the knob rubber 120 may be easily manufactured.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An air vent for a vehicle, comprising:
   a front panel defining an air outlet;
   a duct connected to the air outlet for supplying air thereto; and
   a duct boss protruding from a wall of the duct,
   a damper unit comprising a knob rubber and a damper knob;
   the knob rubber comprising a single-piece rubber body comprising a central portion and a radial portion, the central portion defining a cylindrical through hole, the radial portion radially extending from the central portion and comprising an upper layer and a lower layer; and
   the damper knob comprising a plate-like body, which comprises a portion inserted between the upper layer and the lower layer such that the knob rubber and damper knob form an integral piece;
   wherein the duct boss is inserted through the cylindrical through hole of the central portion of the knob rubber, which enables the knob rubber to rotatably engage with the duct boss for rotating the knob rubber and the damper knob connected thereto about the duct boss without a rubber ring coupled to the damper knob.

2. The air vent of claim 1, wherein the damper knob is tightly fitted with the duct boss.

3. The air vent of claim 1, wherein the damper knob and the knob rubber are integrally formed by dual injection molding.

4. The air vent of claim 1, wherein the damper unit further comprises a stopper protruding from the plate-like body of the damper knob and configured to limit rotation of the damper knob.

5. The air vent of claim 4, wherein the knob rubber is formed over an outer surface of the stopper.

6. A damper unit for an air vent system of a vehicle, the damper unit comprising:
   a damper knob comprising a plate-like body;
   a knob rubber comprising a single-piece rubber body comprising a central portion and a radial portion, the central portion defining a cylindrical through hole, the radial portion radially extending from the central portion and comprising an upper layer and a lower layer; and
   the plate-like body of the damper knob comprising a portion inserted between the upper layer and the lower layer such that the knob rubber and damper knob form an integral piece;
   wherein the cylindrical through hole of the knob rubber is configured to receive a boss of the air vent system, which enables the knob rubber to rotatably engage with the boss for rotating the knob rubber and the damper knob connected thereto about the boss without a rubber ring coupled to the damper knob.

7. The damper unit of claim 6, wherein the damper knob is tightly fitted with the duct boss.

8. The damper unit of claim 6, wherein the damper knob and the knob rubber are integrally formed by dual injection molding.

9. The damper unit of claim 6, wherein the damper unit further comprises a stopper protruding from the plate-like body of the damper knob and configured to limit rotation of the damper knob.

10. The damper unit of claim 9, wherein the knob rubber is formed over an outer surface of the stopper.

* * * * *